May 19, 1970   C. R. BENEDICT ET AL   3,512,669
MOBILE TRANSFER APPARATUS
Filed Sept. 10, 1968
3 Sheets-Sheet 1
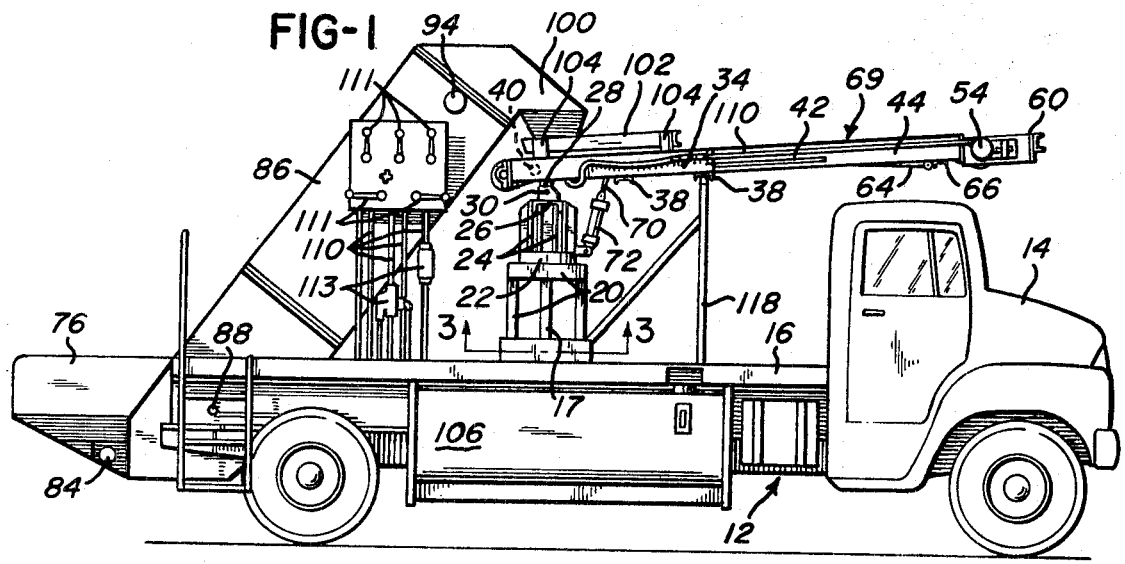
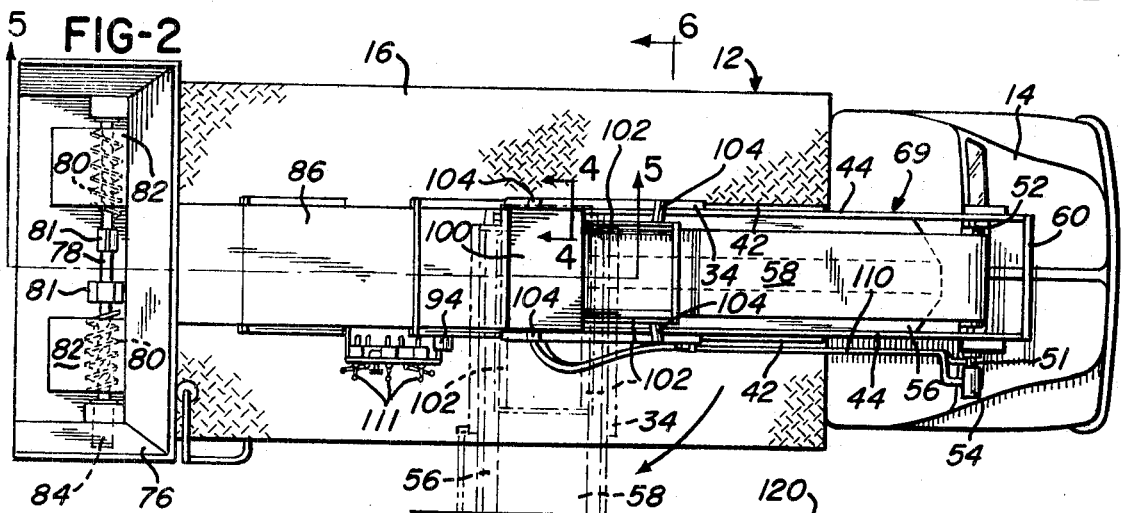
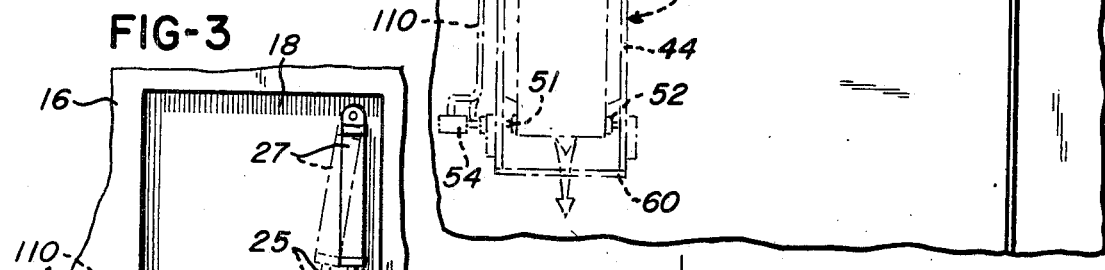
INVENTORS
CHARLES ROBERT BENEDICT
WILLIAM N. EMMONS
BY William R Jacox
ATTORNEY

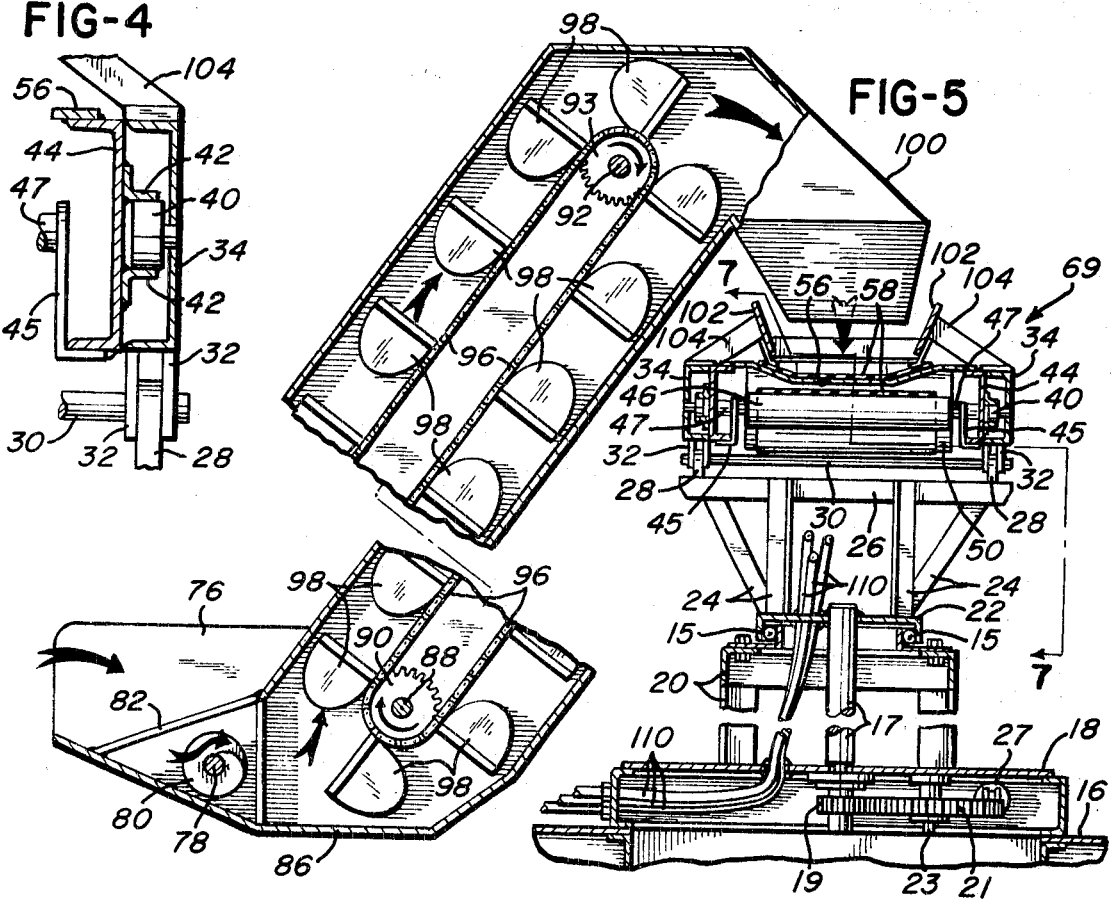

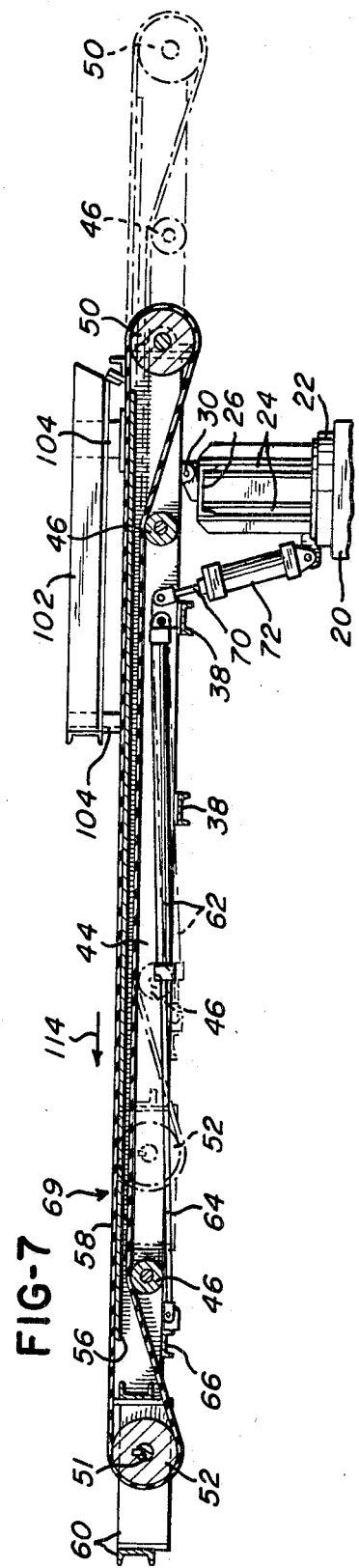

United States Patent Office

3,512,669
Patented May 19, 1970

3,512,669
MOBILE TRANSFER APPARATUS
Charles Robert Benedict and William N. Emmons, Dayton, Ohio, assignors to Clark Benedict Corporation, Dayton, Ohio, a corporation of Ohio
Filed Sept. 10, 1968, Ser. No. 758,786
Int. Cl. B60p 1/38
U.S. Cl. 214—521     4 Claims

ABSTRACT OF THE DISCLOSURE

Mobile transfer apparatus for transferring materials such as sand, gravel, aggregate or the like from a carrier member, such as a truck or the like, to another machine or vehicle, such as a spreader machine or the like. The transfer apparatus includes a hopper for receiving material from a carrier member, an elevator, and a conveyor, the conveyor being rotatable, extendible, and tiltable.

Background of the invention

In several types of construction work, materials such as sand, gravel, aggregate, or the like are transported to a construction location by a carrier vehicle such as a truck or other comparatively large vehicle. At the construction location, the materials are operated upon by various types of machines, such as spreaders, mixers, or the like. Thus, it is necessary to transfer the materials from the carrier trucks or the like to the operating machines. Usually, it is impossible or impractical to transfer the materials directly from the carrier vehicles to the operating machine.

An object of this invention is to provide mobile transfer apparatus which includes means by which materials such as gravel, sand, aggregate, or the like are transferred from a carrier vehicle to an operator machine.

Another object of this invention is to provide such transfer apparatus which is capable of transferring such materials at a relatively high rate.

Another object of this invention is to provide such transfer apparatus which is capable of transfer of such materials from a carrier vehicle to any one of numerous types of operator machines.

Another object of this invention is to provide such transfer apparatus which is capable of transferring such materials to an operator machine which may be positioned at any one of various positions relative to the transfer apparatus and adjacent thereto.

Other objects and advantages reside in the construction of parts, the combination thereof, the method of manufacture, and the mode of operation as will become more apparent from the description of the illustrative embodiments.

Brief description of the drawings

FIG. 1 is a side elevational view of transfer apparatus of this invention.

FIG. 2 is a top view thereof, showing a portion of an operator machine adjacent thereto to which materials are moved by the transfer apparatus.

FIG. 3 is an enlarged sectional view taken substantially on line 3—3 of FIG. 1.

FIG. 4 is an enlarged sectional view taken substantially on line 4—4 of FIG. 2.

FIG. 5 is an enlarged sectional view taken substantially on line 5—5 of FIG. 2.

FIG. 6 is a sectional view taken substantially on line 6—6 of FIG. 2, showing the conveyor mechanism in the position thereof which is shown in broken lines in FIG. 2. This figure also illustrates a plurality of operating positions of the conveyor mechanism.

FIG. 7 is an enlarged sectional view taken substantially on line 7—7 of FIG. 5.

Description of the preferred embodiments

The mobile transfer apparatus of this invention is shown in FIGS. 1 and 2 as being mounted on a truck type of vehicle 12 having a cab 14.

The vehicle 12 has a platform or bed 16. Mounted upon the platform or bed 16 is a base 18. Mounted upon the base 18 is a pedestal 20. Rotatably supported upon the pedestal 20 by suitable bearing members 15 is a table 22.

As shown in FIG. 5, secured to the table 22 for rotation therewith and extending downwardly therefrom is a shaft 17. The shaft 17 has a lower portion thereof within the base 18. Attached to the shaft 17 within the base 18 is a gear wheel 19. The gear wheel 19 is in meshed relationship with a drive gear 21 which is carried by a shaft 23. Pivotally attached to the drive gear 21 is a piston rod 25 which is part of a reciprocally linearly operable fluid motor 27. The fluid motor 27 has an end thereof pivotally carrier by the base 18.

Attached to the table 22 and extending upwardly therefrom are support legs 24. A cross member 26 is attached to the legs 24 at the upper end thereof. Mounted upon the cross member 26 are lugs 28 through which a shaft 30 extends. Feet 32 are carried by the shaft 30. The feet 32 are arranged in pairs, with a pair of feet 32 at one portion of the shaft 30 and a pair of feet 32 at the opposite portion of the shaft 30. Each pair of feet 32 is secured to an elongate main channel 34. Thus, each elongate main channel 34 is pivotally carried by the feet 32 upon the shaft 30. Transverse connector members 38, shown in FIG. 7 attach one channel 34 to the other main channel 34.

Attached to each of the channels 34 is a plurality of roller members 40, one of which is shown in FIG. 4. The roller members 40 are arranged in spaced relationship along each of the main channels 34 and support elongate rail members 42, each of which is attached to an auxiliary or inner channel 44, as shown in FIGS. 4 and 5.

Attached to the lower portion of the channels 44 are brackets 45, one of which is shown in FIG. 4. A shaft 47 is attached to each bracket 45 and extends between the channels 44. An elongate roller member 46 is carried by each shaft 47 and extends between the channels 44, as shown in FIG. 5. FIG. 7 shows the roller members 46 in spaced-apart relationship.

At one end of the auxiliary channels 44 and extending therebetween is an end roller 50. At the other end of the auxiliary channels 44 is a shaft 51 which supports a drive roller 52 for rotation therewith. A rotary fluid motor 54, shown in FIGS. 1 and 2, is attached to the shaft 51 for rotation thereof.

An elongate support shelf 56 is attached to the inner channels 44 and extends therebetween along most of the length thereof as shown in FIGS. 5 and 7.

A conveyor belt 58 encompasses the drive roller 52 and the end roller 50 and has a portion extending therebetween above the shelf 56. The conveyor belt 58 also has a portion extending between the rollers 50 and 52 below the shelf 56 and above the rollers 46, as shown in FIG. 7.

A bracket 60 is attached to the ends of the inner channels 44 adjacent the drive roller 52 and extends outwardly therefrom.

An elongate reciprocally operable fluid motor 62 has an end thereof pivotally attached to one of the connector members 38, as shown in FIG. 7. As stated above, the connector member 38 is attached to the channels 34. Extending from the opposite end of the fluid motor 62 is a piston rod 64. The piston rod 64 is pivotally connected to a cross member 66 which is attached to the auxiliary channels 44.

The channels 34 and 44, the rollers 46, 50, and 52 carried thereby, the fluid motor 62, and the conveyor belt 58 form a unit which is referred to as conveyor mechanism 69.

Also, pivotally attached to the connector member 38 is a piston rod 70 of a fluid motor 72. The fluid motor 72 is angularly inclined, and the lower end thereof is pivotally connected to the table 22.

A hopper 76 is carried by the platform 16 at the rear portion thereof. The hopper 76 is shown as being below the level of the platform 16. An auger shaft 78 extends across the hopper 76 at the bottom portion thereof. The auger shaft 78 has spaced-apart auger portions 80, one auger portion 80 having clockwise convolutions and the other auger portion 80 having counterclockwise convolutions. Paddle members 81 are attached to the auger shaft 78 intermediate the auger portions 80 for agitation and for movement of the material.

A pair of plates 82 are within the hopper 76. Each plate 82 covers one of the auger portions 80.

A rotary fluid motor 84 is mounted at the end of the auger shaft 78, as shown in FIGS. 1 and 2, for rotation of the auger shaft 78.

The central lower part of the hopper 76 has an opening which is in communication with the lower portion of an elevator housing 86. A shaft 88 is supported by the housing 86 at the lower part thereof. A sprocket wheel 90 is carried by the shaft 88. The elevator housing 86 extends upwardly through the platform 16. At the upper portion of the housing 86 and rotatably carried thereby is a drive shaft 92, which has attached thereto a sprocket wheel 93.

Attached to the drive shaft 92 and disposed immediately exterior of the housing 86 is a rotary fluid motor 94, shown in FIGS. 1 and 2. A chain 96 encompasses the sprocket wheels 90 and 93 and has attached thereto buckets 98 for movement therewith.

Attached to the upper portion of the housing 86 and extending downwardly therefrom is a chute 100 which has an opening at the lower end thereof immediately above a portion of the conveyor belt 58. A pair of elongate guide members 102 are disposed adjacent the lower end of the chute 100 at opposed portions thereof. Each of the guide members 102 is supported by braces 104 which are attached to the upper portion of one of the main channels 34.

A fluid reservoir 106, shown in FIG. 1, contains fluid which is used in operation of the fluid motors 54, 84, 94, 27, 62, and 72. A fluid pump, not shown, is operated by power take-off apparatus, not shown, of the vehicle 12. Suitable fluid conductors, such as fluid conductors 110, shown in FIGS. 1, 2, 3, and 5, join the fluid pump to the fluid motors 54. 84, 94, 27, 62, and 72. Suitable valves, fluid regulators, and the like are associated with the fluid conductors 110 for control of fluid therethrough. Operating handles of some of the valves are referred to by reference numeral 111 and some of the regulators are referred to by reference numeral 113 in FIG. 1.

Operation

The vehicle 12 is driven to a location at which any one of several types of construction work is to occur. For example, the vehicle 12 may be driven to a location at which road, highway, or street, or parking lot surfacing is to occur. A truck or the like brings material such as sand, gravel, or aggregate or the like to the construction site. The material is dumped by the truck into the hopper 76. The rotating auger shaft 78, which is rotated by the rotary fluid motor 84, causes the auger portions 80 to force the material toward the central part of the hopper 76. The material is agitated by the paddle members 81 which are attached to the auger shaft 78. The material moves from the hopper 76 into the lower part of the elevator housing 86. Within the housing 86 the buckets 98 are moved clockwise by the chain 96, as the chain 96 is driven by the sprocket wheel 93, which is carried by the shaft 92, which is driven by the rotary fluid motor 94. The buckets 98 carry the material from the lower part of the housing 86 to the upper portion thereof. At the upper portion of the housing 86 the material is dumped from the buckets 98 into the chute 100. The material moves downwardly from the chute 100 and falls upon the conveyor belt 58. The guide members 102 assist in directing the material in its movement from the chute 100 to the conveyor belt 58.

The conveyor belt 58 is rotatably driven by the drive roller 52, which is attached to the shaft 51, which is driven by the rotary fluid motor 54.

The upper part of the conveyor belt 58 rotatively moves toward the left, as illustrated by an arrow 114 in FIG. 7.

The conveyor belt 58 is carried by the inner channels 44 which are carried by the main channels 34. As stated above, the main channels 34 are supported by the cross member 26. When the conveyor belt 58 is not operating, the channels 34 are normally partially supported by a stand 118, as shown in FIG. 1. When it is desired to rotate the conveyor mechanism 69 to the position such as shown in broken lines in FIG. 2 and as shown in solid lines in FIG. 6, the fluid motor 72 is first energized to slightly tilt the conveyor mechanism 69 upwardly and away from the stand 118. Then, the fluid motor 27 is energized, causing movement of the piston rod 25. Thus, the drive gear 21 is rotated. Rotation of the drive gear 21 causes rotation of the gear 19, which is attached to the shaft 17. Thus, the shaft 17 is rotatively moved. Thus, the table 22, which is attached to the upper end of the shaft 17, is rotatively moved. Thus, the conveyor mechanism 69 which is supported upon the table 22 is rotatively moved about the axis of the shaft 17. Thus, the conveyor mechanism 69 is rotatively moved to a position such as illustrated in FIG. 6 which is above a container 120 of a machine such as a spreader or the like, which is located adjacent the vehicle 12.

Thus, material which is carried by the conveyor belt 58 falls therefrom into the container 120.

The conveyor mechanism 69 may be tilted, as illustrated by broken lines in FIG. 6, by operation of the fluid motor 72.

The auxiliary channels 44 which carry the conveyor belt 58 are longitudinally moved with respect to the main channels 34 by operation of the fluid motor 62. Thus, the auxiliary channels 44 which carry the conveyor belt 58 are moved with respect to the chute 100 as the conveyor belt 58 rotatively moves and carries material discharged thereto from the chute 100. The auxiliary channels 44 may be moved to the left or to the right with respect to the guide members 102 in the manner illustrated in FIG. 7.

Therefore, it is understood that the mobile transfer apparatus of this invention is capable of transferring material from a carrier truck or the like to an operating machine such as a spreader or the like. The operating machine may be positioned closely adjacent the transfer apparatus at either side of the vehicle 12 or in spaced relationship from the transfer apparatus. The conveyor mechanism 69 can be rotatively moved, extended, retracted, and tilted as desired to discharge material directly to a receiver thereof.

The invention having thus been described, the following is claimed:

1. Transfer apparatus for transfer of material, such as sand, gravel, aggregate and the like, comprising:
   support structure mounted on a vehicle,
   a pedestal disposed upon the support structure and secured thereto,
   a table rotatably supported upon the pedestal,
   first motor means connected to the table for rotation thereof,
   conveyor mechanism pivotally supported upon the table, the conveyor mechanism including extension means and motor means for operation of the extension means, second motor means attached to the table and to the conveyor mechanism for pivotal movement thereof, a hopper carried by the vehicle, the hopper including auger means and motor means connected to the auger means for rotation thereof, an elevator housing in communication with the hopper so that material moves from the hopper to the elevator housing, the elevator housing extending upwardly and having a chute at a position above the conveyor mechanism, elevator mechanism within the elevator housing and being adapted to carry material to the chute so that the material falls from the chute to the conveyor mechanism, the conveyor mechanism being rotatively movable with rotative movement of the table, the conveyor mechanism being extendable by the extension means, the conveyor means being pivotal by operation of the second motor means, the conveyor means thus being operable to convey material to any one of numerous locations adjacent the support structure.

2. The transfer apparatus of claim 1 in which conveyor mechanism includes:

a pair of main channels which are pivotally supported upon the table, a pair of auxiliary channels carried by the support channels and longitudinally movable with respect thereto, an endless conveyor belt extending along substantially the length of the inner channels and rotatably carried thereby, rotary motor means, means operably connecting the rotary motor means to the conveyor belt for rotative movement thereof, a reciprocally linearly operable fluid motor, means attaching the reciprocally linearly operable fluid motor to the main channels and to the auxiliary channels for longitudinal movement of the auxiliary channels with respect to the main channels.

3. The transfer apparatus of claim 1 in which the first motor means is a reciprocally linearly operable fluid motor, the transfer apparatus including a rotary drive gear wheel and a rotary gear member in meshed relationship one with the other, a shaft attached to the table and to the rotary gear member for rotation one with the other, means pivotally connecting the reciprocally linearly operable fluid motor to the rotary drive gear wheel for rotative movement of the rotary drive gear wheel with linear operation of the linearly operable fluid motor.

4. The transfer apparatus of claim 2 in which rail members are attached to the auxiliary channels and roller members are carried by the main channels for longitudinal movement of the auxiliary channels with respect to the main channels.

References Cited

UNITED STATES PATENTS 3,034,667   5/1962   Kline et al. _____ 214—17
3,414,241   12/1968  De Shano _____ 214—521 XR ALBERT J. MAKAY, Primary Examiner U.S. Cl. X.R.

198—120; 214—83.26